Aug. 26, 1958  W. KOBER  2,849,672
INVERTER CONTROL
Filed April 8, 1954  2 Sheets-Sheet 1
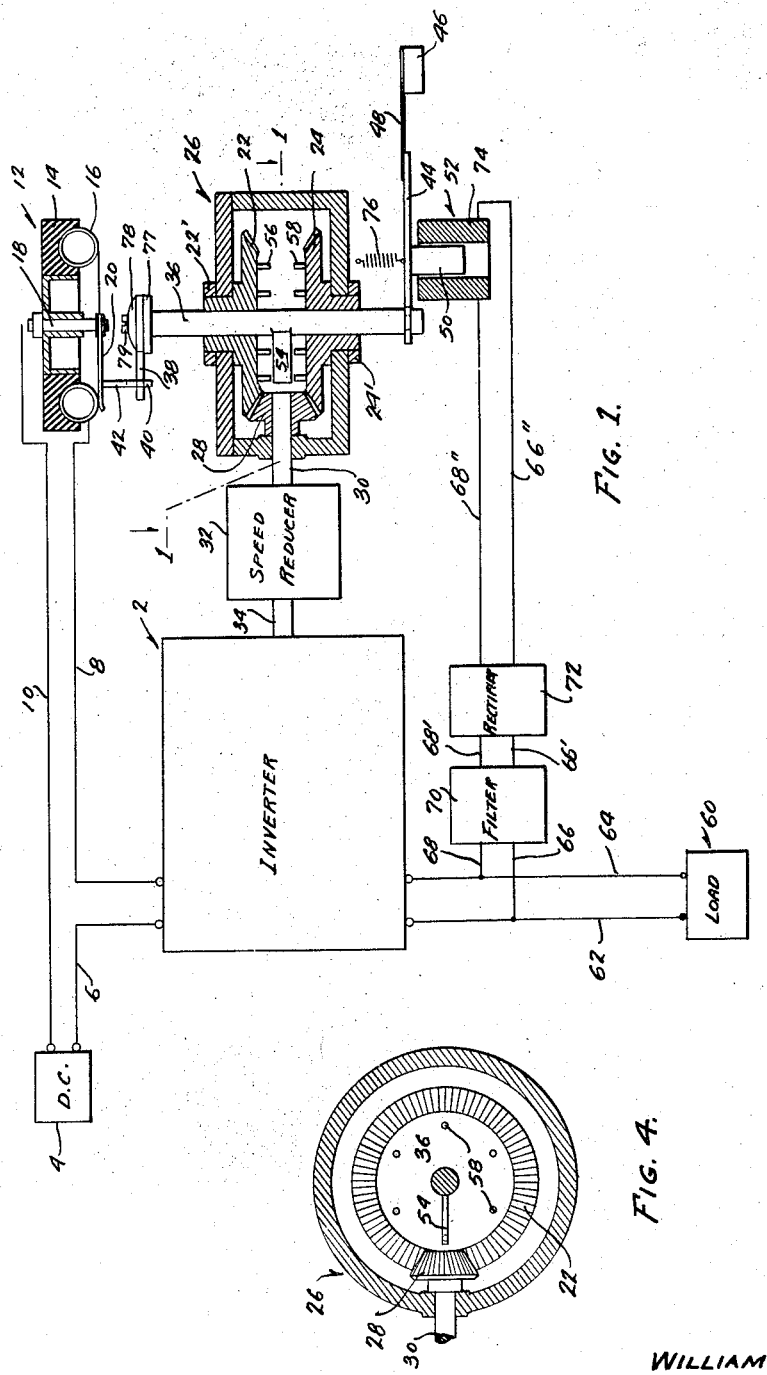
INVENTOR.
WILLIAM KOBER
BY
Bean, Brooks, Buckley & Bean.
ATTORNEYS

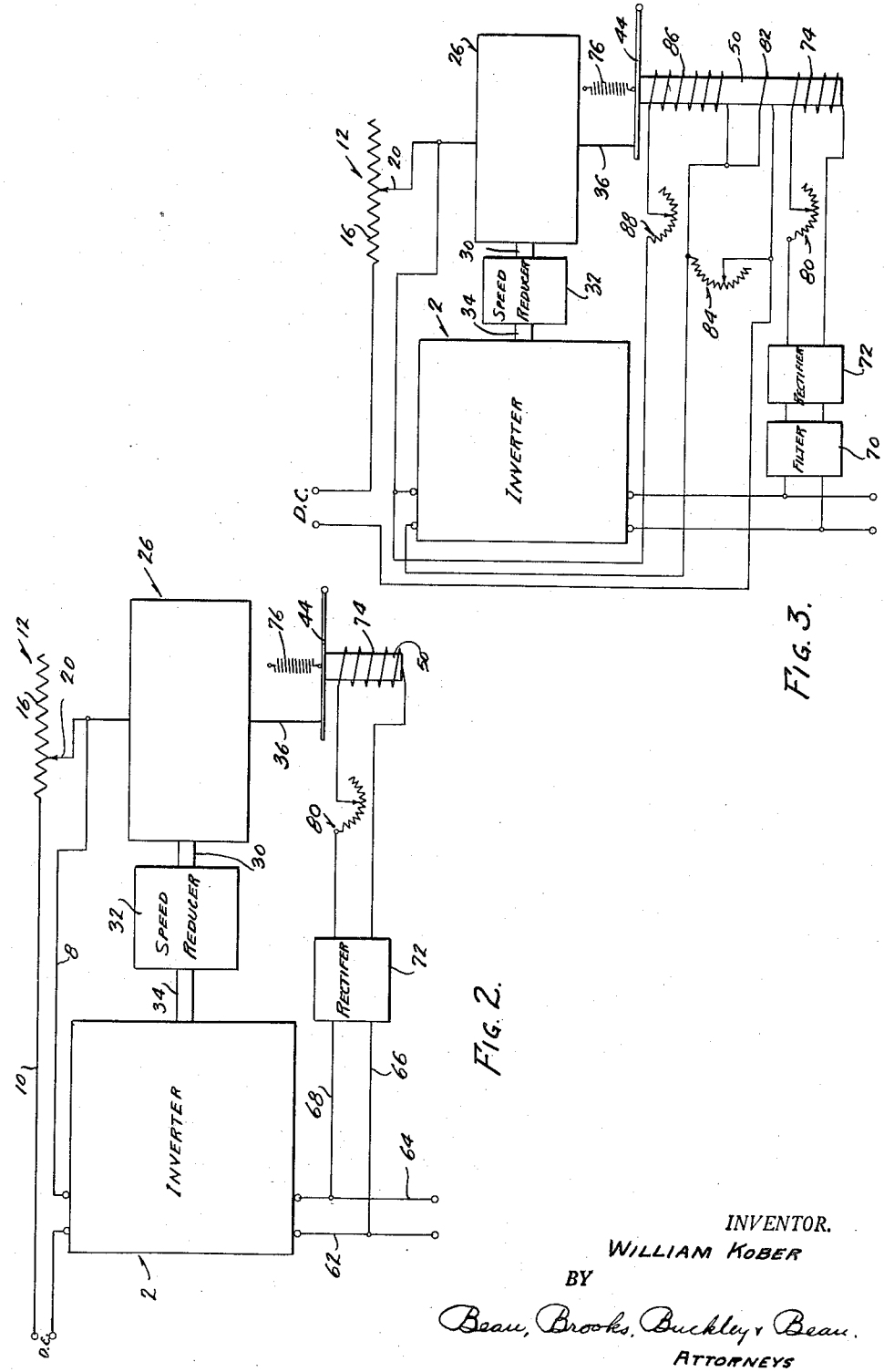

United States Patent Office 2,849,672
Patented Aug. 26, 1958

2,849,672
INVERTER CONTROL

William Kober, Fairport, N. Y., assignor to TKM Electric Corp., Rochester, N. Y.

Application April 8, 1954, Serial No. 421,936

5 Claims. (Cl. 321—18)

This invention relates generally to the control of converters which are operated inverted to produce an alternating current output from a direct current input, which devices are hereinafter referred to as inverters for simplicity and convenience, and more specifically to a new and useful mechanism for controlling the output voltage and frequency thereof. However, while my invention is primarily concerned with certain problems of inverter control and regulation, I do not intend that it be limited thereto as it has utility in many other applications wherein it is desired to effect a control by mechanical means.

There are many instances wherein it is desired to use inverters for converting direct current input into an alternating current output, as for example in aircraft and other vehicles carrying storage batteries and having electronic equipment which usually require A. C. power. The problem with which this invention is particularly concerned is to provide a simple, relatively inexpensive and practical mechanism for maintaining the A.-C. output voltage and frequency of an inverter substantially constant despite a widely varying direct current input voltage thereto such as occurs, for example, with a storage battery power supply during charging, or with a heavy load, or with the batteries running down.

In an inverter of relatively low impedance, it is known that the output voltage and frequency bear a substantially constant ratio with the input voltage, and will therefore vary with variations in the input voltage. When the input voltage varies over wide limits, the output voltage and frequency will similarly vary and in installations wherein a relatively constant output voltage and frequency are required, it is essential that some form of voltage and frequency control be provided.

If the inverter has a wound field, it is possible to vary the field and this will vary the armature speed and the output frequency. However, such field control does not change the substantially constant ratio between the input and output voltages, whereby the output voltage will continue to vary with the input voltage.

Of course, if the inverter has a permanent magnet field, it is far more difficult to vary the field and thereby control the output frequency. In addition, it has been found that with a permanent magnet field inverter there is a particularly close relation between the input voltage and the output voltage and frequency, under all load conditions.

In order to provide a more accurate control, it is also frequently desired to correct for the voltage drop occurring in the brushes and windings of the D. C. portion of the inverter.

Accordingly, it is a primary object of my invention to provide a practical, simple and economically feasible mechanical regulating mechanism for controlling a dynamoelectric machine.

A further object of my invention is to provide a simple yet extremely rugged and dependable electro-mechanical control for maintaining the output voltage and frequency of an inverter substantially constant when the inverter is operated with a variable direct current power supply.

A control mechanism according to my invention is adapted to vary an adjustable control device automatically in response to an operating characteristic of a dynamoelectric machine, and is characterized by the provision of a pair of oppositely moving members, with a control member, normally neutral, which is movable, responsive to such operating characteristic, into selective engagement with said oppositely moving members for being moved thereby, said control member being connected to said control device for adjusting the same upon movement by one of said oppositely moving members.

In a more specific embodiment thereof, a control mechanism according to my invention is adapted to adjust a control device such as a rheostat which is interposed in series between an inverter and its power supply, and is characterized by a pair of oppositely rotating plate members, rotated at reduced speed from the inverter armature shaft, and a control shaft rotatable about an axis and connected to said rheostat, said control shaft being shiftable along said axis and carrying a part adapted for selectively engaging said oppositely rotating members, together with electrical actuating means responsive to an operating characteristic of the inverter, such as the input voltage of the inverter and, if desired, the D. C. input current thereto, or the inverter output voltage or frequency, or a combination thereof, for axially shifting said control shaft. If desired, this control mechanism is adapted to be responsive to mechanical operating characteristics such as the armature speed.

Other objects and advantages of my invention will become clearly apparent from the ensuing detailed description, taken together with the accompanying drawings forming a part thereof wherein like reference numerals designate like parts throughout the various views and wherein:

Fig. 1 is a generally diagrammatic view of an inverter control mechanism according to my invention, the mechanism being responsive to the output voltage and frequency;

Fig. 2 is a diagrammatic view of a control mechanism of my invention arranged for response to the inverter output voltage;

Fig. 3 is a diagrammatic view of my inverter control mechanism arranged for response to the inverter input voltage, or to the input current, or to the output voltage and frequency, or to a combination thereof; and Fig. 4 is a fragmentary detail view, taken about along plane 1, 1 of Fig. 1, of a portion of a control mechanism according to my invention.

My invention is primarily concerned with a new and useful mechanical arrangement for automatically adjusting an electrical control device, and a preferred form of mechanism according to my invention is illustrated in detail in Figs. 1 and 4. The drawings show this mechanism in an inverter output control arrangement, and for simplicity, those elements of the installation which are of conventional known form the details of which comprise no part per se of the invention are indicated schematically but in a manner indicating clearly the nature thereof whereby to enable anyone skilled in the art to practice my invention without unduly complicating this disclosure.

Referring now to Figs. 1 and 4 of the accompanying drawing, there is shown an inverter, generally designated 2, of any conventional known form the details of which form no part per se of the invention, which inverter is operated from a suitable direct current source, generally designated 4, assumed, for purposes of the instant invention, to be subject to variation over a relatively wide range. Inverter 2 is connected to source 4 directly through one lead 6 connected to suitable terminals on inverter 2 and source 4, and indirectly through a pair of leads 8 and 10 connected to suitable terminals on inverter 2 and source 4, respectively, and connected to each other through a rheostat device, generally designated 12, connected in series therewith. Thus, rheostat 12 is interposed between inverter 2 and its D. C. source 4, in series therewith, and rheostat 12 is varied by a mechanism according to my invention, in a manner to be described, for automatically maintaining the inverter output or frequency, or both of them, substantially constant. A carbon pile or other conventional adjustable resistance could be used in place of rheostat 12.

Rheostat 12 is itself of a conventional form comprising, for example, a base body or portion 14 mounting a resistor coil 16. Lead 8 is connected to coil 16, and lead 10 is connected to a shaft 18, journaled for rotation in base 14, carrying the contact arm 20. Arm 20 is adapted to be moved across coil 16 thereby to vary the electrical resistance interposed by rheostat 12 in the inverter supply connection, and a mechanism for automatically varying the position of contact arm 20 on coil 16 to maintain the inverter output substantially constant with a variable input thereto, will now be described.

In the preferred form illustrated in Figs. 1 and 4, the oppositely moving members comprise oppositely rotating plate members in the form of a pair of bevel bears 22 and 24 rotatably journaled, as by suitable bushings or bearing members 22' and 24', in the opposite side walls of a housing member generally designated 26.

A bevel pinion gear 28 is rotatably journaled, as by a suitable bushing in the side wall of housing 26 and engages both gears 22 and 24 for driving the same. Gear 28 is carried on a shaft 30 which is coupled, through a conventional, gear or other type, speed reducing mechanism 32, to the inverter armature shaft 34, whereby gear 28 is driven by the armature shaft 34 at a reduced speed relative thereto and serves to rotate gears 22 and 24 in opposite directions, this drive being continuous with the inverter operation. It will be appreciated that independent drive means can be provided, if desired, but the illustrated arrangement is preferred for its extreme simplicity.

A shaft 36 is also journaled in the opposite side walls of housing 26 for rotation about an axis coincident with the axis of rotation of gears 22 and 24, and extends through the gears 22 and 24 centrally thereof through the bushings 22' and 24'. Shaft 36 carries at or adjacent one end thereof a radial arm 38 which engages in the forked outer end 40 of an arm 42 carried by the rheostat contact arm 20, whereby shaft 36 is axially shiftable because of the lost motion connection between arms 42 and 38, and whereby rotation of shaft 36 will act through arms 38 and 42 to correspondingly rotate the rheostat contact arm 20.

Adjacent its opposite end, shaft 36 carries a lever 44 which has its remote end connected to a fixed support 46, as through a flexure plate 48, and lever 44 carries the armature core 50 of an actuating solenoid generally designated 52.

Intermediate its opposite ends shaft 36 carries a grapple part in the nature of an arm 54 fixed thereto and extending radially therefrom between gears 22 and 24. Arm 54 is adapted, upon axial shifting of shaft 36, to engage either between pins 56 spaced around the inner face of gear 22 or between pins 58 spaced around the inner face of gear 24, for being driven thereby to rotate shaft 36 and contact arm 20, as will become clearly apparent.

In the arrangement of Fig. 1, the control mechanism is automatically responsive to the inverter output voltage and frequency. Thus, the inverter is connected to the load, generally designated 60, through leads 62 and 64 connected to suitable terminals on the inverter and on the load. Leads 66 and 68 interconnect leads 62 and 64, respectively, with a frequency sensitive filter mechanism schematically illustrated at 70. Filter 70 is in turn connected through leads 66' and 68' to a rectifier schematically illustrated at 72, and rectifier 72 is connected through leads 66'' and 68'' to the coil 74 of solenoid 52.

Filter 70 comprises a frequency sensitive filter mechanism of any conventional known form, the details of which form per se no part of the instant invention. Such filter may comprise, for example, a hi-pass or band pass filter of the pi type, having a number of series condensers and shunt resistances, and provide an output which varies in part with the frequency and in part with the voltage, of the inverter output, and the relative effect depends on the filter components which may be chosen to provide an almost pure frequency response, or an almost pure voltage response, or any combination thereof. For purposes of the instant invention, it is preferred that filter 70 have a total response determined substantially equally by the output frequency and the output voltage, and thereby being about half frequency response and about half voltage response. The output frequency and the output voltage will have about the same relative deviation, and by providing a control based substantially equally upon the output frequency and output voltage both will be kept closer to the desired value thereof than if the control were based primarily upon one or the other alone.

Rectifier 72 is also of a conventional known form, such as, for example, a selenium, copper oxide or other dry disc type, the details of which per se form no part of the invention.

In operation, lever 44 is balanced against the pull of solenoid 52 on plunger 50, as by spring 76, to cause arm 54 to occupy a neutral position intermediate gears 22 and 24 whenever the inverter output voltage and frequency is at the predetermined desired value. However, should the output voltage, for example, rise above said predetermined value because of an increase in the D. C. input voltage, such increase will be reflected in increased energization of coil 74 of solenoid 52, causing coil 52 to retract armature 50 and shift shaft 36 in a direction away from rheostat 12 whereupon arm 54 will move between the pins 58 on plate 24 and, upon being engaged by one of said pins, will be driven by the rotating gear 24 to rotate shaft 36 and, through arms 38 and 42, the rheostat contact arm 20, thereby increasing the effective resistance of coil 16. This correction will continue until such time as the output voltage has returned to the predetermined desired value, whereupon shaft 36 will shift to move arm 54 to its neutral position.

Upon a voltage variation below the desired value, coil 74 will expell armature 50 to move shaft 36 and pull arm 54 into the path of the pins 56 on gear 22, whereupon arm 54 will be engaged by one of said pins to rotate shaft 36 in the opposite direction, causing contact arm 20 to decrease the effective resistance of coil 16, such movement continuing until the output voltage is restored to the desired value.

The lost motion connection provided by the forked arm part 40 enables the axial shifting of shaft 36, and it will be appreciated that other connections such as having arm 38 engaging axial splines on shaft 36, could be utilized if desired.

The advantages of this mechanism are obvious. For example, the mechanism is extremely simple and rugged, and by reason of the relatively slow rotation of gears 22 and 24 there is no difficulty or unwarranted force in the engagement of arm 54 with the pins 56 and 58 for being driven thereby. Also, assuming a speed of rotation of the gears 22 and 24 of 150 R. P. M., and assuming that the complete range of the rheostat can be covered in 180° of motion of the contact arm 20, this control mechanism will produce full range control in two-tenths of a second, disregarding the minute response time of the solenoid 52, whereby it will be seen that the correction is extremely rapid. The pin and arm drive is positive during the engagement thereof and, by virtue of the extremely rapid response, a substantially constant inverter output is readily maintained.

If desired, to avoid damage to the control mechanism as by the rheostat arm being driven beyond fixed limits during starting or stopping of the mechanism, a safety torque limiting device, comprising for example arm 38 being forced against a friction plate 77 fixed on shaft 36, as by a conical spring 78 held in place by a screw 79, can be provided. The friction engagement between arm 38 and plate 77 would give under a predetermined force. Alternatively, the rheostat can be so designed that it can be rotated continuously without injury, as by providing a slide plate at the end of the coil 16.

Fig. 2 shows a simple arrangement wherein the parts remain the same, as in Fig. 1, and wherein the control mechanism, generally indicated by the housing 26, is responsive only to the inverter output voltage, filter 70 being dispensed with. The operation remains the same, with the control mechanism responding automatically to output voltage variations to vary rheostat 12 accordingly, whereby to automatically maintain a substantially constant output voltage with a variable input voltage. An adjustable resistance 80 is provided for selecting the level of energization of the solenoid coil 74. Resistance 80 can be similarly arranged in the circuit of Fig. 1. In this arrangement, the output frequency will also be held reasonably constant because of its relation to the output voltage.

Fig. 3 shows another method of inverter control in accord with my invention wherein there is provided, as an addition to the inverter output responsive solenoid coil 74, a second coil 82 connected in series with the D. C. input for influencing the solenoid operation by the D. C. input current, and this can be selected as to polarity and amount, as by an adjustable control shunt 84, so that voltage drops in the D. C. brushes and winding of the inverter are corrected for. This will also, through proper selection of the input current coil, correct in part at least for the A. C. voltage drops in the system, and this performs well since the A. C. load current and the D. C. load current vary dependently.

To further modify the response, a solenoid coil 86 can be provided, this coil being connected through an adjustable series resistance 88 across the input terminals of the inverter and therefore responsive to the D. C. input voltage. This would help to maintain the D. C. input voltage constant.

Coil 86 can be used alone, as can coil 74, and coil 82 can be added to either thereof, or all three can be used. It is preferred to use coils 82 and 86 in many instances, because the rectifier 72 can then be dispensed with.

In each instance, the control mechanism remains the same, Figs. 1, 2 and 3 simply showing circuit connections for varying the response of the control actuator.

Whereas I have disclosed my invention in a preferred form thereof, I do not intend to be limited to the details of such form because it is susceptible of modifications. For example, in place of the spaced pins engaging the arm, oppositely rotating friction plates could be used, and other modifications will occur to those skilled in the art. Also, a control mechanism according to my invention is useful other than in inverter control. For example, it can be used to vary the axial air gap in a machine such as that disclosed in my pending application Ser. No. 217,799, now Patent No. 2,784,332. Accordingly, I intend that my invention be limited only by the scope of the appended claims. Having fully disclosed my invention, and completely described its mode of operation, what I claim as new is:

1. A control mechanism for maintaining substantially constant the output frequency of a dynamoelectric machine having a direct current input and an alternating current output comprising, an adjustable electrical control device interposed in the input circuit of said machine, a pair of movable members, drive means for moving said members in opposite directions, control means normally biased to a neutral position with respect to said members and selectively engageable therewith for being moved thereby in opposite directions, means operatively connecting said control means with said control device for adjusting the latter upon movement of said control means by either of said members, and means for shifting said control means into selective engagement with said members automatically in response to variations in the output frequency of said machine including electrically actuated means operatively associated with said control means for shifting the same and energizing circuit means for said electrically actuated means including frequency sensitive means operatively associated with the output circuit of said machine.

2. The control mechanism set forth in claim 1, wherein said energizing circuit means includes means operatively associated with the input circuit of said machine for influencing said electrically actuated means in response to the input current to said machine.

3. A control mechanism as set forth in claim 1, wherein said energizing circuit means includes means for adjusting the level of energization of said electrically actuated means.

4. In a control mechanism for maintaining substantially constant the output of a dynamoelectric machine having a direct current input and an alternating current output, an adjustable electrical control device interposed in the input circuit of said machine, a pair of movable members, drive means for moving said members in opposite directions, actuator means normally biased to a neutral position with respect to said members and selectively engageable therewith for being moved thereby in opposite directions, means operatively connecting said actuator means to said control device for adjusting the latter upon movement of said actuator means by either of said members, and means for shifting said actuator means into selective engagement with said members including electrically actuated means operatively associated with said actuator means for so shifting the same and energizing circuit means for said electrically actuated means including means operatively associated with said input circuit for influencing said electrically actuated means in response to the input current to said machine.

5. A control mechanism as set forth in claim 4, wherein said energizing circuit means includes adjustable control means to correct for voltage drops in the machine.

References Cited in the file of this patent
UNITED STATES PATENTS

| | | |
|---|---|---|
| 648,493 | Hewlet | May 1, 1900 |
| 1,008,244 | Creveling | Nov. 7, 1911 |
| 2,475,997 | Smith | July 12, 1949 |
| 2,496,608 | Thomas | Feb. 7, 1950 |